June 29, 1937. C. E. GILLIN 2,085,310
SIGNAL DEVICE FOR AUTOMOBILES
Filed Sept. 2, 1936
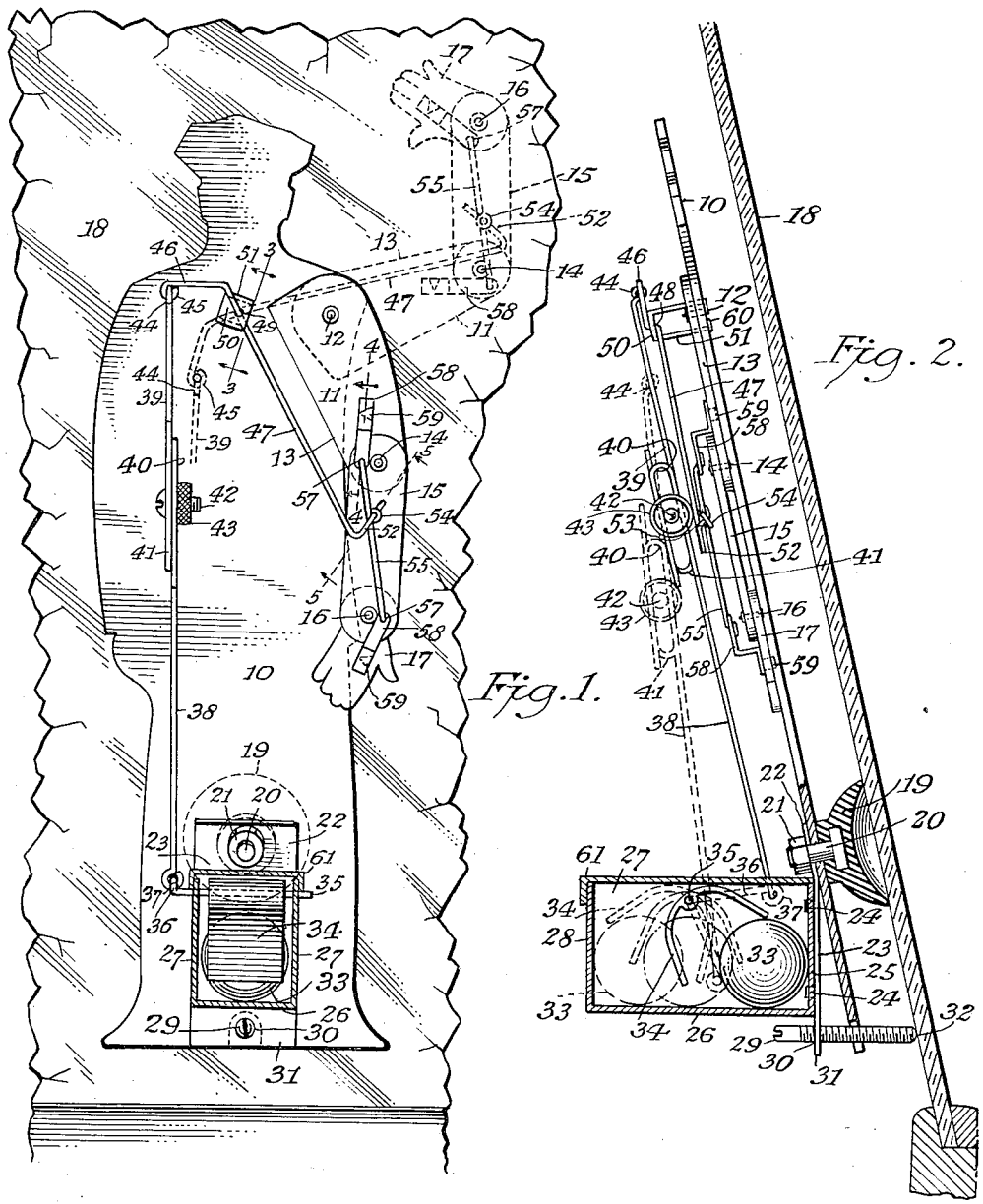
INVENTOR.
Charles E. Gillin,
BY A. R. Appleman
ATTORNEY Patented June 29, 1937

2,085,310

UNITED STATES PATENT OFFICE 2,085,310

SIGNAL DEVICE FOR AUTOMOBILES

Charles E. Gillin, Brooklyn, N. Y.

Application September 2, 1936, Serial No. 99,008

6 Claims. (Cl. 116—52)

This invention relates generally to automobile signals employed for safety in driving and more particularly to automatically controlled devices for stop signals for avoiding rear end collisions in traffic and for farther relieving the driver of some responsibility.

An object of this invention is to provide automatic means, foreign to the drivers many tasks, which is manipulated by the movements of a car itself, so that a trailing driver may be apprised or informed of the intentions of the driver ahead as regards speed reduction and increase.

The ulterior object being to provide a construction, in a signal, especially adapted for attachment to inclined panes of window glass present in the streamlined rear windows of modern cars, there being means for adjusting the device to any reasonable angularity from the vertical, preferably parallel to the window pane to which it is attached, of course, the device may be applied elsewhere to a car if desired.

Another feature of the invention relates to certain balancing arrangements whereby movable parts of the signal may be limited or controlled in their movements.

In the drawing illustrating one embodiment of the invention:—

Fig. 1 is a rear face elevation of a cut-out figure or emblem made according to my invention, as applied to the rear face of a rear window of an automobile, foldable parts being shown in their normal position in full lines and indicated by dotted lines in their operative signalling position when the car is slowing down or stopping;

Fig. 2 is a side or edge elevation with parts in section;

Fig. 3 is a detail on the line 3—3 of Fig. 1;

Fig. 4 is a detail on the line 4—4 of Fig. 1; and

Fig. 5 is a detail on the line 5—5 of Fig. 1.

Referring now to the construction in detail, 10 designates a base, figure, panel or emblem depicting, for the purpose of this description, a traffic officer provided with a three part right arm 11, pivoted as at 12, to the base or figure 10, at the right shoulder portion, on a pin or otherwise to permit free swinging movement.

The bicep part of the arm is indicated at 13; which is freely pivoted as at 14, to the forearm part 15, forming an elbow joint, while the forearm is pivoted as at 16, to the hand part 17, to form a wrist joint all as shown in Fig. 1.

The figure 10 is preferably secured to the inner face of the rear window 18, of an automobile by a vacuum or suction cup 19, made fast to said figure by a bolt 20 or the like, secured by a nut 21, as shown in Fig. 2 of the drawing.

Interposed between said nut and the figure 10, is an upward extension 22 of a bendable metallic plate 23, secured by tongues 24, struck therefrom and clinched through the forward end wall 25 of a runway or box 26, having parallel side walls 27, and a forward end wall 28. A set screw 29, passes through an orifice 30 in a downwardly projected portion 31, of the plate 23, through a space formed at the lower end of said figure 10 and into contact with the window glass 18 as at 32, to retain the runway 26, at an approximate horizontal position; by this set-screw 29, the runway 26, may be adjusted with respect to a true horizontal, to properly control a motor ball 33 riding on the runway 26 in the movements of the car for coaction with an oscillatory yoke-cap 34, rocking with a shaft 35 journalled in the side walls 27 of said runway, said shaft being extended and bent at an angle as shown, to form an arm 36, provided at its end with an eye or loop 37 for connection with a two-part adjustable link 38—39, said parts having opposed elongated loops 40—41 receiving a cross bolt 42 and clamped together by a suitable nut 43, which performs the double function of clamping the link parts and for acting as a balance for maintaining the signal arm of the figure in the raised position to warn a following driver of a car, of an intended slow-down or stop of a car ahead.

The movements of the three-part arm are controlled through a series of links and levers preferably of spring wire causing little friction and which may be described as follows:—

The upper end of the upper link part 39 is formed with a loop or eye 44, which is joined to a similar loop or eye 45, formed from the free end of a short arm 46, of a lever 47, which has a shoulder or bend 48, adapted to pass through a bearing, orifice or hole 49, in the top plate 50, of a box bearing 51, (see best Fig. 3). The side walls of the box bearing serving as stops for limiting the swinging movements of the lever 47, as shown in Fig. 1 and said lever is formed at its lower free end with a backwardly or acutely bent arm 52, having a shoulder 53, which is passed through a coil or eye 54 (Fig. 5) of a bar 55, having its opposite ends bent into shoulders 56 (Fig. 4) which pass through bearing holes 57 in the ends of projective plates 58, secured by tongues 59 to the respective bicep and hand parts 13 and 17 of the three piece arm 11. The box bearing 51, is also secured by tongues 60, (Fig. 3) to the figure 10.

The runway 26, with its respective side and end walls 27—28 and cover 61, may also be termed a motor-box; and other alternative designations may be applied to the respective parts in the claims to produce clear but concise understanding.

It is thought that the operation and utility of the signal device will be apparent without farther description, and it is to be understood that the structural elements thereof are susceptible to such variations falling within the scope of the claims.

The material from which the figure or emblem is formed may be rigid cardboard, fiber board, or metal of any appropriate thickness or weight such as aluminum or the like.

What I claim is:

1. In a signal of the class described, a base; means for removably attaching the base to the rear window pane of an automobile; a three part signal device pivoted to said base; a runway adjustable on said base; a motor ball on said runway; an oscillatory yoke-hood partially enclosing said ball; and connections between the yoke-hood and the signal device for raising said signal to its highest position when the ball is caused to roll forwardly on the runway when the speed of the car is diminished.

2. In a stop signal, an upright figure; means for attaching the figure to a rear window of an automobile; a signal arm pivoted to said figure; a runway adjustably carried by the figure; a shaft located across the runway and having a bent arm; a motor ball movable on said runway; an oscillatory yoke-hood on said shaft operated by movements of said ball; a lever pivoted on said figure and to said signal arm; and a connection between said bent arm and the said lever for raising the signal arm when the motor ball rolls into contact with the oscillatory yoke-hood.

3. In a signal of the class described, a supporting figure; a signal arm member comprising a bicep, a forearm and a hand part, said parts having respective pivot connections; a pivot connection between the assembled arm and said figure; a motor box adjustably carried by said figure; a shaft extending across said motor box; a rock-arm projecting from said shaft; means within the box for operating said arm when a car slows down; and connections between said rock-arm and said signal arm for raising the latter to warn a trailing driver.

4. In a stop signal for automobiles, a base figure; a three-part arm pivoted thereto; a motor box on the base figure; a swingable hood; a shaft for supporting said hood on the motor box; a crank arm on said shaft; a floating or rolling motor ball supported by the motor box and operative to contact with and swing said hood; and connections between the crank arm and the three-part arm for raising the latter to warn a trailing driver.

5. A signal for automobiles comprising a human figure fixed at the rear window thereof; a jointed arm pivoted to the right arm corner portion of said figure; motive means supported by said figure; connections between a powered part of the motive means and said arm whereby it may be raised to the signalling position when the momentum of the car is decreased; and a counterweight carried on one of said connections for holding the arm in said signalling position as desired.

6. An automobile signal device comprising an emblem fixed in a desired position to the car; a motor box on the emblem; a swing-arm pivoted to the emblem, a tiltable link connection between the arm and the emblem; a two-part adjustable link extending from an end of said tiltable-link; a balance weight on the two part link; a rock-arm connected to said link; a shaft extending therefrom and through said motor box; a hood on said shaft and a motor ball in said motor box for contacting said hood when the automobile brakes are applied for operating the signal.

CHARLES E. GILLIN.